United States Patent [19]

Kim

[11] 4,177,594
[45] Dec. 11, 1979

[54] FISHING ROD ATTACHMENT
[75] Inventor: Chin K. Kim, Chicago, Ill.
[73] Assignee: Bong K. Kim, Melrose Park, Ill. ; a part interest
[21] Appl. No.: 887,154
[22] Filed: Mar. 16, 1978
[51] Int. Cl.² .............................................. A01K 97/00
[52] U.S. Cl. .......................................... 43/15; 43/19.2
[58] Field of Search ...................... 43/15, 16, 19.2, 25; 267/168, 170, 175, 177

[56] References Cited

U.S. PATENT DOCUMENTS

| | | | |
|---|---|---|---|
| 1,012,899 | 12/1911 | Nelson | 43/15 |
| 2,590,721 | 3/1952 | Muth | 43/15 |
| 2,640,290 | 6/1953 | Ames | 43/15 |
| 2,799,110 | 7/1957 | Miller | 43/15 |
| 2,808,609 | 10/1957 | Schultz | 267/177 |
| 2,850,831 | 9/1958 | Setierdahl | 43/15 |
| 3,078,609 | 2/1963 | Efird | 43/15 |
| 3,200,530 | 8/1965 | Dworski | 43/16 |

FOREIGN PATENT DOCUMENTS

| | | | |
|---|---|---|---|
| 2263108 | 5/1974 | Fed. Rep. of Germany | 43/15 |
| 330206 | 10/1935 | Italy | 267/177 |

Primary Examiner—Nicholas P. Godici
Attorney, Agent, or Firm—Bernard L. Kleinke

[57] ABSTRACT

A fishing device adapted to be attached to a fishing rod having a fishing line connected at one of its ends to the rod and at its other end to a fishhook includes an inner tube telescoping within and axially aligned with an outer tube which is adapted to be attached to the fishing rod in parallel disposition thereto. A hook device is mounted on the inner tube and is adapted to be attached releasably to the fishing line. A main spring device urges resiliently the tube to an initial position, and a latching device fixes releasably the tubes in a set position against the force of the main spring and frees the two tubes relative to one another in response to a force applied to the hook device via the fishing line so that the tubes return abruptly under the force of the main spring to their initial position, thereby jerking on the fishing line to set the fishhook in place to catch a fish. The main spring includes a pair of first and second coil springs threadably interconnected in axial alignment with the first coil spring disposed within and fixed to the outer tube and with the second coil spring being disposed within and fixed to the inner tube, whereby the overall length of the main spring device may be adjusted by threadably advancing forwardly or backing out of one of the first and second coil springs relative to the other one of the first and second coil springs. The hook device includes a tubular member having a backwardly inclined slot therein and having a spring loaded hook mounted on a block slidably mounted therein for receiving loosely an intermediate portion of the fishing line extending into the interior of the tubular member within the slot so that a push rod can move slidably within the block to move the hook to a position out of alignment with the slot to enable the intermediate portion of the fishing line to be inserted into the slot and subsequently thereto when the force is applied to the line, to release the line from the fishing device. A buzzer is provided to provide an attention attracting signal when a fish exerts a force on the fishline. A cam mechanism both releases the hook device and sets the buzzer in preparation for catching the fish.

8 Claims, 6 Drawing Figures

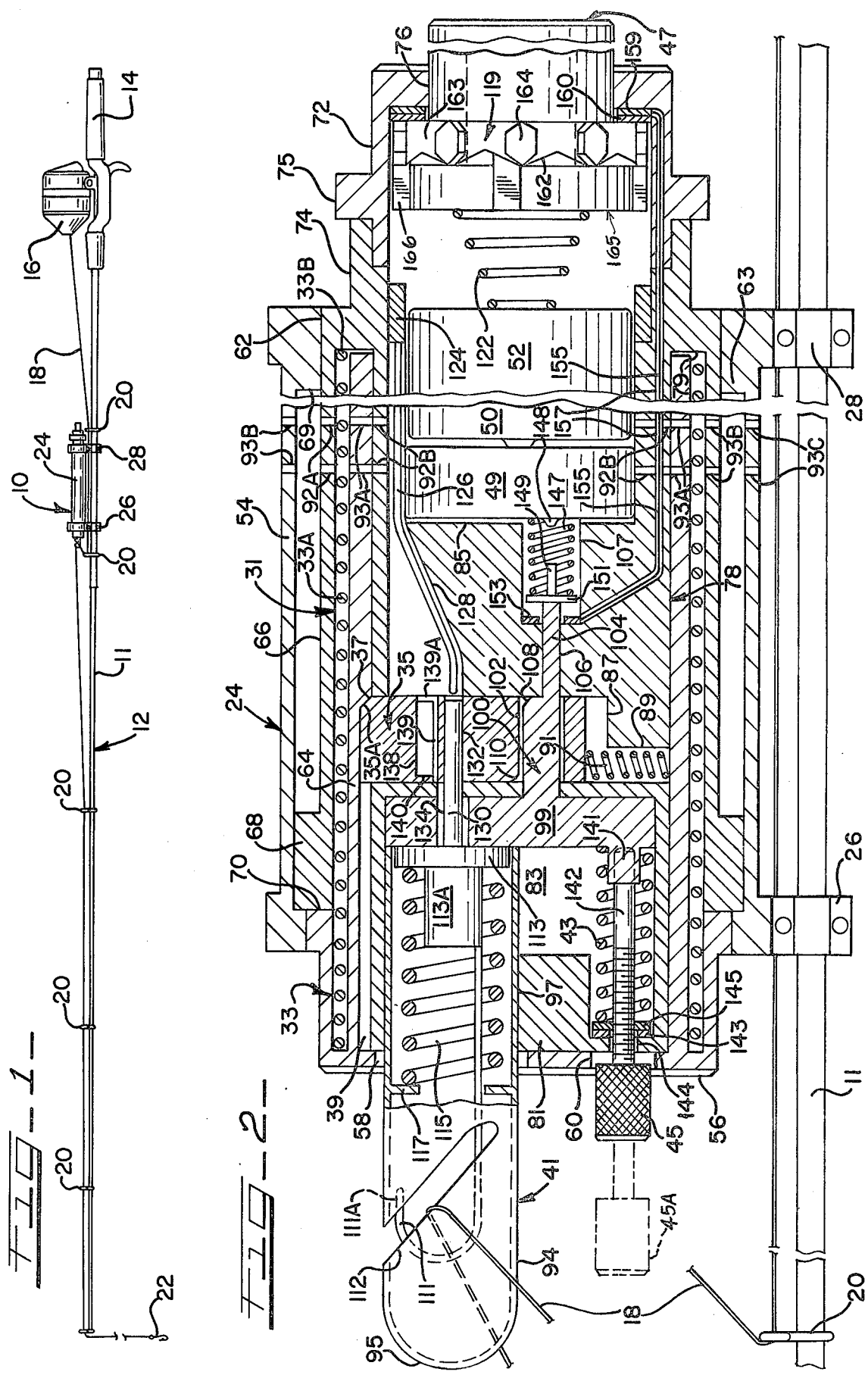

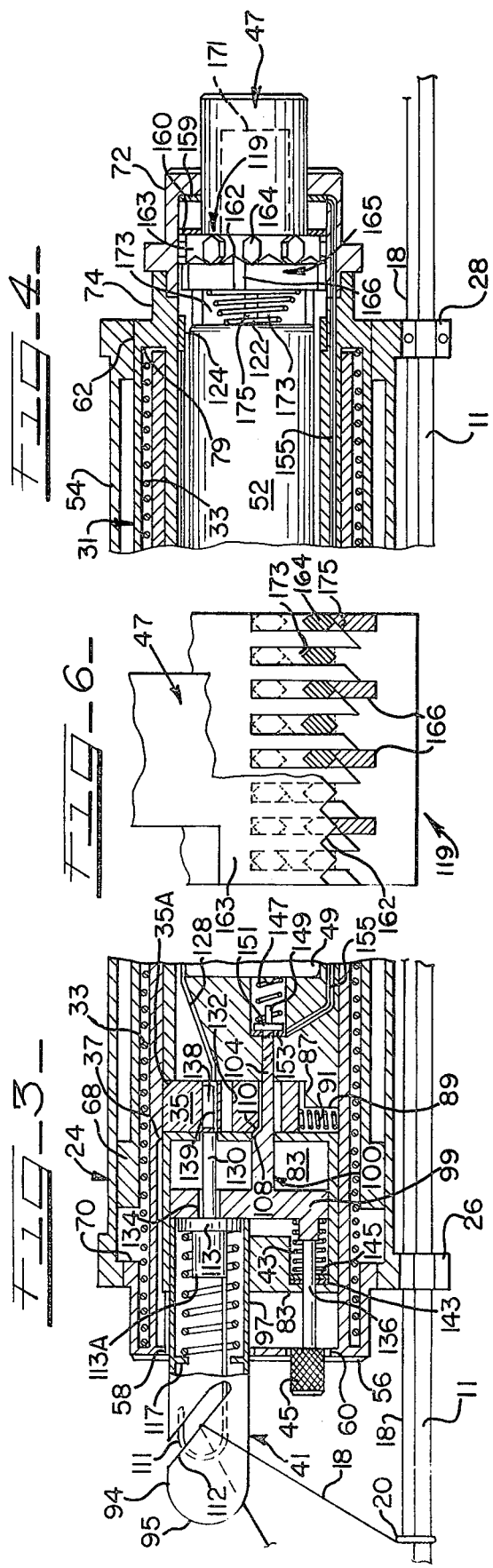

FISHING ROD ATTACHMENT

BRIEF SUMMARY OF THE INVENTION

In the past, many different types and kinds of devices have been employed for the purpose of catching fish. In this regard, special types of fishing rods have been employed to facilitate the setting of the fishhook in a positive manner so as to facilitate the catching of the fish. For example, reference may be made to the following U.S. Pat. Nos. 3,943,650 and 3,956,845. While such devices have been satisfactory for some applications, it would be highly desirable to have a simple and relatively inexpensive device which may be attached to a conventional fishing rod or pole to facilitate the setting of the fishhook during a fishing operation. In this regard, it would be highly desirable to have a device which would be readily attached to a fishing rod or pole and used to pull on a fishing line in an abrupt manner when the fish pulls on the line so as to set automatically the hook in the fish's mouth. Alternatively, the attachment need not be used on certain occasions, if desired.

Therefore, it is the principal object of the present invention to provide a new and improved attachment for fishing rods or the like, which fishing attachment is relatively inexpensive to manufacture and facilitates in the setting of the fishhook.

Briefly, the above and further objects are realized by providing a new and improved fishing device adapted to be attached to a fishing rod and having an inner tube telescoping within and axially aligned with an outer tube which is adapted to be attached to the fishing rod in parallel disposition thereto. A hook device is mounted on the inner tube and is adapted to be attached releasably to the fishing line. A main spring device urges resiliently the tubes to an initial position, and a latching device fixes releasably the tubes in a set position against the force of the main spring and frees the two tubes relative to one another in response to a force applied to the hook device via the fishing line so that the tubes return abruptly under the force of the spring device to their initial position, thereby jerking on the fishing line to set the fishhook in place to catch a fish. The main spring is in the form of a pair of coil springs interconnected threadably end-to-end so that the overall length of the main spring may be adjusted for storage purposes.

BRIEF DESCRIPTION OF DRAWINGS

Other objects and advantages of the present invention relating to the adjustable spring feature as well as others will become apparent to those skilled in the art when considered in connection with the accompanying drawings, wherein:

FIG. 1 is a pictorial side elevational view of the fishing device, which is constructed in accordance with the present invention and which is shown attached to a fishing device prepared to set automatically the hook during a fishing operation;

FIG. 2 is a greatly enlarged fragmentary cross-sectional elevational view of the device of FIG. 1;

FIG. 3 is a fragmentary reduced-scale elevational view of the front portion of the device of FIG. 2 illustrating it in an intermediate position moving from its set position after a pulling force is applied to the fishing line;

FIG. 4 is a reduced-scale cross-sectional elevational view of the rear portion of the device of FIG. 2;

FIG. 5 is a cross-sectional reduced-scale elevational view of the device of FIG. 2 illustrating it in its final position after the device has been released by the pulling force applied to the fishing line; and FIG. 6 is a developmental view of the cam mechanism of the rear portion of the device of FIG. 2.

DETAILED DESCRIPTION

Referring now to the drawings, and more particularly to FIGS. 1 and 2 thereof, there is shown a new and improved fishing device 10, which is constructed in accordance with the present invention, and which is shown attached to a pole 11 of a fishing rod 12 having a handle 14 with a reel 16 mounted thereon. A fishing line 18 is mounted on the reel 16 and extends through a series of eyelets 20 on the pole 11 and terminates at a fishhook 22, which is adapted to be baited for fishing purposes. The device 10 generally comprises an outer tube 24 which is fixed to the pole 11 by a pair of clamps 26 and 28 to position the outer tube 24 in a parallel disposition on the upper portion of the pole 11. An inner tube 31 is disposed within the outer tube 24 in an axially aligned slidable manner. As best seen in FIGS. 2 and 5 of the drawings, a main spring 33 comprising a pair of axially aligned coil springs 33A and 33B threadably engaging one another as best seen in FIG. 5 of the drawings to form one long spring urges resiliently the inner and outer tubes to the position as shown in FIG. 5 of the drawings. The two-piece main spring enables the overall length of the unit to be adjustable for storage purposes as hereinafter described in greater detail. A latch member 35 is mounted for radially slidable movement on the inner tube 31 to engage a chamferred shoulder 37 at the end of an internal groove 39 of the outer tube 24 to fix releasably the inner tube 31 within the outer tube 24 in a set position as best seen in FIG. 2 of the drawings against the force of the main spring 33 to prepare the device 10 for catching a fish. A hook assembly 41 mounted on the forward end position of the inner tube 31 is adapted to receive an intermediate portion of the fishing line 18 to pull abruptly the fishing line rearwardly within the outer tube 24 when the latch member 35 releases the inner tube 31 relative to the outer tube as hereinafter described in greater detail when a pulling force is exerted on the fishing line 18. A latch spring 43 cooperates with an adjustment knob 45 mounted externally of the hook assembly 41 to enable the adjustment of the amount of tension required to release the latch member 35 as hereinafter described in greater detail. A push button 47 is reciprocatively mounted at the rear end portion of the inner tube 31 for causing the fishing line 18 to be free from the hook assembly 41 as hereinafter described in greater detail and for turning off a buzzer 49 energized by a pair of batteries 50 and 52, so that, when the latch 35 is released, the buzzer 45 generates an attention-attracting signal and the push button 47 may be pushed inwardly to turn off the buzzer 49 and release the line 18 from the hook assembly 41, to enable the reel 16 to be operated for pulling in the fish.

Considering now the outer tube 24 in greater detail with particular reference to FIGS. 1, 2 and 3 of the drawings, the outer tube 24 generally comprises a tubular body portion 54 having a cup-shaped front member 56 fixedly connected thereto by any convenient technique such as by a threadable engagement (not shown) or other suitable technique. A large opening 58 in the front member 56 permits a portion of the hook assembly 41 to extend therethrough when the device 10 is disposed in its set position as shown in FIG. 2 of the drawing. A smaller opening 60 in the front member 56 receives the adjustment knob 45 when the device 10 is disposed in its set position as shown in FIG. 2 of the drawings. A rear opening 62 in a rear end wall 63 receives the inner tube 31 in a slidable manner to enable the inner and outer tubes to the axially aligned with one another in a telescoping manner.

An integral internal tube 64 extends rearwardly from the front member 56 terminating near the rear edge of the rear opening 62 and is spaced radially from the inner tube 31 to receive the main spring 33 therebetween, which extends between the front member 56 and the inner surface of the inner tube 31.

The main spring 33 normally biases the inner and outer tubes to assume their overall maximum length with the inner tube 31 extending rearwardly from the rear opening 62 of the outer tube 24 as shown in FIG. 5 of the drawings. In that position, the overall length of the main spring 33 is substantially the same as the overall length of the inner and outer tubes. In order to store the device 10 with the inner tube 31 disposed within the outer tube 24, as shown in FIG. 2 of the drawings, without causing the main spring 33 to remain under tension for long periods of time, the coil springs 33A and 33B are threadably interengaged as shown in FIG. 5 of the drawings with their opposite ends fixed to the respective outer and inner tubes. As a result, in order to shorten the overall length of the inner and outer tubes of the device 10, the inner tube 31 may be rotated about its central axis to thread its coil spring 33B along the other coil spring 33A of the outer tube 24, whereby the inner tube 31 can then be moved axially within the interior of the outer tube 24 until the inner tube 31 is disposed in the position shown in FIG. 2 of the drawings, and the two springs 33A and 33B are completely interengaged threadably and are relaxed for storage purposes. In order to prepare the device 10 for use after a storage period, the inner tube 31 may be rotated again about its central longitudinal axis in an opposite direction to back the inner tube 31 out of the outer tube 24 and, at the same time, back the coil spring 33B out of the other coil spring 33A until only the last few coil turns interengage threadably one another as shown in FIG. 5 of the drawings.

Considering now the inner tube 31 in greater detail with references to FIGS. 2, 3 and 5 of the drawings, the inner tube 31 generally comprises a tubular body portion 66 which is generally circular in cross section throughout its length to enable it to be inserted within the outer tube 24 which is also generally circular in cross section throughout its length. An external annular flange 68 of the tubular body portion 66 is disposed near but spaced from the front end portion of the tubular body portion 66 and is adapted to engage an internal forwardly facing annular flange 69 at the rear wall 63 of the outer tube 24 to limit the rearward axial movement of the inner tube 31 relative to the outer tube 24 as best seen in FIG. 5 of the drawings. During a forward axial movement of the inner tube 31 relative to the outer tube 24, a rearwardly facing annular shoulder 70 of the outer tube 24 serves as a stop member to engage the annular flange 68 of the inner tube 24 or limiting the forward movement thereof as best seen in FIG. 2 of the drawings.

A cup-shaped rear member 72 is fixed to the tubular body portion 66 by any convenient technique such as a threadable engagement (not shown) and extends rearwardly from the outer tube 24 when the inner tube 31 is disposed therewithin as shown in FIG. 2 of the drawings. A reduced diameter portion 74 of the tubular body portion 66 enables the fingers of the users to grasp the outer tube 24 immediately in front of an external annular flange 75 of the cup-shaped member 72 for grasping the inner tube 31 and pushing it axially within the outer tube 24 until the inner tube is disposed within the outer tube as shown in FIG. 2 of the drawings.

A rear opening 76 in the cup-shaped rear member 72 reciprocatively receives the push button 47 which extends outwardly therefrom.

An inner concentric block 78 of the tubular body portion 66 is integral with and extends from an internal annular shoulder 79 of the tubular body portion 66 extending from the reduced diameter portion 74 at the rear end thereof and terminating at the front end portion thereof in a thick front wall 81, behind which is disposed a hook assembly compartment 83. A compartment 85 is disposed to the rear of the hook assembly compartment 83 for confining the batteries 50 and 52 in end-to-end axial alignment with the buzzer 49 disposed in axial alignment in front of the battery 50, as best seen in FIG. 2 of the drawings. A latch compartment 87 and the tubular body portion 66 confines the latch member 35, and a small compartment 89 communicating with the larger compartment 87 receives a coil spring 91 which urges resiliently the latch member 35 radially outwardly, as best seen in FIG. 2 of the drawings.

In order to permit the attention-attracting sound signal produced by the buzzer 49 to exit the device 10, when a fish has tripped the device 10 and the inner tube 31 has snapped rearwardly to the position as shown in FIG. 5 of the drawings, a series of radially expending perforations or openings 92A extend through the tubular body 66 in alignment with openings or perforations 92B extending radially through the inner concentric block 78 into communication with the buzzer and battery compartment 85 as best seen in FIGS. 2 and 5 of the drawings. For the purpose of permitting the attention-attracting sound to exit the device 10, when it is disposed in its set position as shown in FIG. 2 of the drawings, when a fish merely nibbles on the bait carried by the hook 22 to momentarily sound the buzzer 49 as hereinafter described in greater detail, a series of radially extending openings 93A in the internal tube 64 are aligned with the openings 92A and with a series of openings 93B extending radially in the tubular body portion 54 of the outer tube 24.

Considering now the hook assembly 41 in greater detail with particular reference to FIGS. 2, 3 and 5 of the drawings, the hook assembly 41 includes a hollow tubular member 94 having at its front end portion a rounded nose 95 and extending through an opening 97 in the thick front wall 81 of the tubular body portion 66. A block 99 is slidably mounted within the tubular member 94 and has an elongated tail member 100 extending rearwardly therefrom through an opening 101 and the tubular body portion 66 communicating with the latch compartment 87, and from there an opening 102 in the latch member 35 terminating in a cut-out portion 104 which extends through an opening or passage 106 and into a compartment 107 when the device 10 is disposed in its set position as shown in FIG. 2 of the drawings. When the latch member 35 moves into engagement with the cut-out rear portion 104 of the tail 100 as a force is applied to the fishing line 18 by a fish pulling on the hook 22, the slidable block 99 is pulled forwardly within the compartment 83, as shown in solid lines in FIG. 3 and as indicated in FIG. 2 in the broken line showing of the knob at 45A. A corner cam surface 35A of the latch member 35 cooperates with the shoulder 37 at the end of the internal group 39, under the force of the compressed main spring 33, to move the latch member 35 radially inwardly until it engages the cut-out portion 104 as shown in FIG. 3 of the drawings. In order to facilitate this camming action, a rounded corner or camming surface 108 at the transition between the main portion of the tail member 100 and the cut-out narrow portion 104 mates or cooperates with a corresponding rounded corner portion or camming surface 110 opposite the corner 35A of the latch member 35 at the forward upper end portion of the opening 102 therein. Once the cam member 35 moves out of the groove 39, the inner tube 31 is free of the outer tube 24, and the inner tube 31 snaps rearwardly under the force of the spring 33 until the external annular flange 68 at the rear end of the inner tube 31 engages the internal forwardly facing annular flange 69 of the outer tube 24 in the position as illustrated in FIG. 5 of the drawings.

In order to retain loosely the fishing line 18 to the inner tube 31 to pull the line abruptly rearwardly into the outer tube 24, as shown in FIG. 5 of the drawings, for setting the hook 22 in the mouth of a fish, a hook 111 is disposed within the tubular member 94 opposite an open slot or opening 112 to retain the fishing line 18 within the slot 112. A boss 113A fixed to the shank portion of the hook 111 projects forwardly from a slidable block 113 mounted at the rear of the compartment 83 and is integral therewith to provide a seat for a return spring 115 surrounding the shank portion of the spring 111 between the block 113 and an internal annular shoulder 117 of the hollow tubular member 94. As a result, when the block 113 moves forwardly to advance the hook 111 until the front distal end portion 111A thereof is moved to a position forwardly of the slot 112, the fishing line 18 is free therefrom. In this regard, after the hook 22 is set in the mouth of the fish and the block 113 is pulled forwardly by the fishing line 18 until the distal end portion 111A of the hook 111 is disposed forwardly of the slot 112 so that the fishing line 118 can then slide forwardly out of the open slot 112 and over the upper portion of the tubular member 94. As a result, the fish pulls the fishing line out of the interior of the outer tube 24 to enable the user to operate the fishing reel 16 to pull in the fish. It should be noted that the fishing rod 12 is used independently of the device 10 once the hook 22 is set in the mouth of the fish, and if desired, the fishing rod may be used entirely in a conventional manner without employing the device 10, since the fishing line 18 is completely free and independent of the device 10.

After the hook 111 is moved to a forward position, the return spring 115 snaps the block 113 and thus the hook 111 to their rearward most position with the block 113 disposed in engagement with the sliding block 99 as shown in FIG. 2.

In order to control the movement of the hook 111, the push button 47 causes a cam mechanism 119 to move axially forwardly against the force of a conical coil spring 122 disposed between the cam mechanism 119 and the rear end portion of the battery 52 for the purpose of causing the hook 111 to move forwardly to free the fishing line 18. In this regard, a ring 124 disposed forwardly of and engaging the cam mechanism 119 is pushed forwardly by the mechanism 119 to turn push axially forwardly a rod 126 disposed within a passage 128 in the tubular body portion 66. A rod 130 is engaged by and pushed axially forwardly by the front distal end portion of the rod 126, the rod 130 being connected fixedly to the slidable block 113, which in turn moves the hook 111 forwardly. An opening 132 extending transversely through the latch member 35 receives the rod 130 when the latch 35 is disposed in its set position as shown in FIG. 2 of the drawings. An opening 134 in the slidable block 99 receives the intermediate or shank portion of the rod 130 and is disposed in alignment with the opening 132 when the latch member 35 is disposed in its latch position (FIG. 2). In this regard, after the inner tube 31 is moved to the set position as shown in FIG. 2 of the drawings, the push button 47 is pressed inwardly by the thumb of the user until the push button 47 is disposed in its inner most position with the spring 122 fully compressed. By doing this, and retaining the pressure against the button 47, the ring 124 moves forwardly axially as a result of the force supplied to it by the cam mechanism 119. The ring 124 then pushes in turn the rod 126 forwardly, and the forward end of the rod 126 pushes in turn the rod 132. As a result, the block 113 and the hook 111 fixed thereto move forwardly until the forward distal end portion 111A of the hook 111 clears the slot 112. At this point, the thumb of the user continues to apply the pressure to the push button 47 to hold it fully depressed until the fishing line 18 is slipped through the upper open end portion of the slot 112 to insert the fishing line down into the slot 112. Thereafter, the pressure is released on the push button 47 and the spring 122 then causes the push button to retract fully outwardly until it reaches the position as shown in FIG. 2, as hereinafter more fully described, in its fully retracted position shown in FIG. 2, the button 47 and the cam mechanism 119 prepare the buzzer to be actuated when a pulling force is applied to the line 18. By thus relieving the pressure applied to the rod 126 and 130, the return spring 115 forces the slidable block 113 and its hook 111 backwardly until the block 113 engages the block 99 to cause the distal end portion 111A of the hook 111 to move through and thus close the upper end portion of the slot 112 to retain loosely the fishing line 18 in the slot 112.

After a fish pulls on the fish line 18 to release the latch member 35 and thus to cause the inner tube 31 to snap rearwardly to the position as shown in FIG. 5 of the drawing, the fishing line 18 is thus pulled rearwardly within the outer tube 24, since the rear end portion of the fishing line is retained within the fishing reel 16. Since the fishing line is trapped loosely within the slot 112, the forward end portion of the fishing line is then pulled rearwardly abruptly to set the hook 22 in the mouth of a fish. In order to free in a quick convenient manner the fishing line 18 from the tubular member 94 so that the fishing line 18 can be reeled in, the push button 47 is once again pushed inwardly to a fully depressed position against the force of the spring 122 to enable the hook 111 to move forwardly within the hollow tubular member 94 for freeing the fishing line from the open slot 112. In this regard, once the distal end portion 111A of the hook 111 moves forwardly to a position for clearing the slot 112, the pulling force exerted by the fish on the front end portion of the fishing line 18 pulls the line 18 out of the slot 112 over its open upper end portion thereof and thus out of the interior of the outer tube 24. In this regard, it should be noted that the slot 112 is inclined downwardly and rearwardly at an angle such that the fishing line 18 can be readily pulled along the edge of the slot 112 upwardly and out of the slot 112 in a convenient manner without snagging the line 18, whereby the line 18 can be quickly released from the hook assembly 41 and the user can commence reeling in the fish. Once the line 18 is free of the hook assembly 41, the pressure is released from the button 47 to permit it to snap back to the partially retracted position as shown in FIG. 4 of the drawings under the control of the cam mechanism 119 as more fully described hereinafter in greater detail. By depressing the button 47 to free the line 18, the buzzer 49 is turned off as hereinafter described in greater detail.

Once the inner tube 31 has snapped back into the released position as shown in FIG. 5 of the drawings, and when the button 47 is depressed to release the fishing line 18 from the hook assembly 41, it should be noted that the latch member 35 is resting on the cut-out portion 104 of the tail member 100, in which position the opening 132 is no longer in alignment with the push rod 126. For this reason, a second opening 138 extending through the latch member 35 has an L-shaped push rod 139 reciprocatively mounted therein. When the latch member 35 is disposed in the position illustrated in FIG. 5 of the drawings, the distal end portion of the rod 126 is disposed opposite the rear end upstanding portion of the push rod 139. Thus, when the latch 35 is disposed in the position as illustrated in FIG. 5 of the drawings, the rod 130 fixed to the slidable block 113 is disposed out of the opening 132 as well as the opening 138, since it was necessary to enable the latch member 35 to move radially inwardly into engagement with the cut-out portion 104. The L-shaped push rod 139 thus serves as an extension or connecting link between the rod 126 and the rod 130 when the latch member 35 is disposed in its release position as illustrated in FIG. 5 of the drawings. As best seen in FIG. 2 of the drawings, the rear upstanding portion 139A of the push rod 139 is adapted to engage an internal shoulder 140 at the forward end portion of the opening 138.

Considering now the tension adjustment for the device 10, a forwardly projecting boss 141 integrally connected to the sliding block 99 serves to seat one end of the coil spring 43 which surrounds a threaded rod 142 journaled for rotation within the hook assembly compartment 83, the rod 142 being disposed in a parallel-spaced manner with the tubular member 94. An annular bearing 143 surrounds the rod 142 at the forward end portion thereof near an opening 144 in the fixed wall 81, the rod 142 extending through the opening 144 and having its forward distal end portion terminating in the adjustment knob 45. A nut 145 is threadably engaged by the rod 142 so that, when the knob 45 is grasped by the fingers of the user and rotated so that the rod 142 rotates about its axis, the nut 145 moves rearwardly from the position as illustrated in FIG. 2 of the drawings to compress the spring 43. By compressing the coil spring 43, the pressure exerted by the spring 43 on the slidable block 99 to urge it resiliently rearwardly relative to the thick front wall 81 may be adjusted. In this regard, when a fish pulls on the fishing line 18, the tubular member 94 and the block 99 fixed to it are pulled forwardly within the compartment 83 against the force of the adjustment spring 43. By increasing the tension on the spring 43, a greater pulling force acting on the fishing line 18 is required to trip the latch member 35. Consequently, by reducing the tension on the spring 43, a more gentle pulling force on the fishing line can trip the latch member 35.

Considering now the buzzer 49 in greater detail, with particular reference to FIGS. 2, 3, 4 and 5 of the drawings, a coil spring 147 is disposed in and axially aligned with the compartment 107 in the tubular body portion 66, the rear end portion of the spring 147 engaging the terminal 148 of the buzzer 49 to electrically contact it. A post 149 is integrally connected to and extends rearwardly from a slidably mounted electrical contact 151, the plane of which extends transversely across the compartment 107 to move into electrical engagement with an annular electrical contact 153 fixed to the tubular body portion 66 at the front entrance to the compartment 107 to complete an electrical circuit to energize the buzzer 49, the electrical circuit including the buzzer 49, the coil spring 147, the contact 151, the contact 153, a conductor 155, extending within a passageway 157 in the body portion 66, an annular electrical contact 159 disposed within the rear cup-shaped member 72 surrounding the push button 47, an annular electrical contact 160 surrounding the push button 47 within the interior of the cup-shaped member 72 fixed to the cam mechanism 119, the cam mechanism 119, the coil spring 122, and the two batteries 50 and 52. In this regard, when the user initially depresses the push button 47 to enable the fishing line 18 to be secured to the hook assembly 41, the push button 47 is subsequently released and it is urged outwardly to its further most position by means of the spring 122 and the cam mechanism 119 to close the contacts 159 and 160 as shown in FIG. 2 of the drawings. In this position, the device 10 is prepared for generating the attention-attracting signal by the buzzer 49, since the contacts 151 and 153 need only to be closed to complete the electrical circuit to the buzzer 49. It should be noted at this point that, should a fish only pull momentarily on the fishing line 18, the contact 151 and 153 will engage electrically one another only momentarily to generate a short beeping sound to alert the user that a fish is beginning to nibble at the bait. However, such a momentary pull on the fishing line would not be sufficient to release the latch member 35. Once a sufficient pulling force is applied to the latch member 35 to release it so that the inner tube 31 snaps rearwardly to the position as illustrated in FIG. 5 of the drawings, the contacts 151 and 153 remain closed to complete the circuit to the buzzer 49 to sound a constant buzzing signal to alert the user that a fish has now been caught by the hook 22.

Once the attention-attracting signal is sounded, the user again depresses the button 47 to release the fishing line 18, and once the line 18 is released, the button 47 is permitted to snap back to the position as illustrated in FIG. 4 of the drawings. In that position, the spring 122 and the cam mechanism 119 cause the button 47 to extend outwardly to a substantially lesser extent as the position shown in FIG. 2 of the drawings, whereby the contacts 159 and 160 remain spaced apart to open the circuit to the buzzer 49 until such time as the push button 47 is depressed to once again attach releasably the fishing line to the hook assembly 41.

Considering now the camming mechanism 119 in greater detail, with particular reference to FIGS. 2, 4 and 6 of the drawings, the camming mechanism 119 is similar in design to a conventional well-known camming mechanism and push-button assembly (not shown)

of a ball point pen for advancing and retracting ink writing cartridges. In this regard, a serrated edge 162 of a forward rim 163 (FIGS. 2 and 4) carrying a series of radial projections 164 at the serrated edge 162 cooperates with a cam member 165 (FIGS. 2 and 4) which has a series of widely spaced apart radially extending cam projections 166 having inclined camming surfaces to mate with the serrated camming edge 162. A rearwardly extending integral hub 171 (FIGS. 2 and 4) of the cam member 165 is disposed freely rotatably within the hollow interior of the button 47 so that the cam member 165 is free to rotate within the button 47 whereby each time the button 47 is pressed inwardly, the cam member 165 rotates about its axis and is indexed to the next position in a similar manner as well-known ball point pen camming mechanisms.

A series of alternating longer grooves 173 and shorter grooves 175 in the inside surface of the cup-shaped rear member 72 are adapted to receive alternatingly the mating projections 164 and 166. In this regard, when the button 47 is depressed, for example as shown in phantom lines in FIG. 6, the cam member 165 is pushed axially inwardly with its projections 166 disposed in the longer slots 173. In this position, the button 47 is then partly retracted only as shown in FIG. 4 of the drawings. When the button 47 is subsequently depressed and then released, the cam member 165 rotates about its axis and is advanced to the next position by means of the serrated edge 162 of the button 47, whereby, as indicated in FIG. 6 of the drawings, the projections 164 and 166 enter the short grooves 175 to cause the button 47 to remain in its fully retracted position as shown in FIG. 2 of the drawings.

The embodiments of the invention in wich an exclusive property or privilege is claimed are defined as follows:

1. In a fishing device adapted to be attached to a fishing rod having a fishing line connected at one end to the rod and at the other end to a fishhook, the combination comprising: an outer elongated member adapted to be attached toa fishing rod in parallel disposition thereto; an inner member movably mounted within said outer member; hook means mounted on said inner member and adapted to be attached releasably to the fishing line; main spring means for urging resiliently said members to an initial position; latching means for fixing releasably said members in a set position against the force of said main spring means and for freeing the two members relative to one another in response to a force applied to said hook means via the fishing line so that said members return abruptly under the force of said main spring means to their initial position, thereby jerking on the fishing line to set the fishhook in place to catch a fish; wherein said hook means includes a tubular member having a backwardly inclined slot therein and having a spring loaded hook mounted on a block slidably mounted therein for receiving loosely an intermediate portion of the fishing line extending into the interior of said tubular member within said slot, push rod means for moving slidably said block to move said hook to a position out of alignment with said slot to enable the intermediate portion of the fishing line to be inserted into said slot and subsequently thereto when the force is applied to the line, to release the line from the fishing device.

2. A fishing device according to claim 1, wherein said main spring means includes a pair of first and second coil springs threadably interconnected in axial alignment, said first coil spring being disposed within said outer member and being fixed thereto, said second coil spring being disposed within said inner member and being fixed thereto so that the overall length of said spring means may be adjusted in size by threadably advancing forwardly or backing out of one of said first and second coil springs relative to the other one of said first and second coil springs.

3. A fishing device according to claim 1, wherein said hook means includes an elongated tail member, said latching means including a latch member mounted on said tail member, spring means urging resiliently said latch member radially outwardly, means defining an opening in the front end portion of said outer member for receiving said latch member.

4. In a fishing device adapted to be attached to a fishing rod having a fishing line connected at one end to the rod and at the other end to a fishhook, the combination comprising: an outer elongated member adapted to be attached to a fishing rod in parallel disposition thereto; an inner member movably mounted within said outer member; hook means mounted on said inner member and adapted to be attached releasably to the fishing line; main spring means for urging resiliently said members to an initial position; latching means for fixing releasably said members in a set position against the force of said main spring means and for freeing the two members relative to one another in response to a force applied to said hook means via the fishing line so that said members return abruptly under the force of said main spring means to their initial position, thereby jerking on the fishing line to set the fishhook in place to catch a fish; wherein said hook means includes an elongated tail member, said latching means including a latch member mounted on said tail member, spring means urging resiliently said latch member radially outwardly, means defining an opening in the front end portion of said outer member for receiving said latch member; wherein said tail member includes a cut-out portion for receiving a portion of said latch member, and wherein said latching means further includes cam means on said latch member to cooperate with shoulder means on said outer member at the end portion of said opening to cause said latch member to be cammed radially inwardly when a force is applied to the fishing line to pull said tail member forwardly until its cut-out portion is disposed opposite said latch member, whereby said latch member is cammed into engagement with said cut-out portion of said tail member.

5. A fishing device according to claim 4, wherein said latch member includes an opening therein and a push rob slidably mounted therein for engaging said tail member to cause said hook to be moved forwardly.

6. In a fishing device adapted to be attached to a fishing rod having a fishing line connected at one end to the rod and at the other end to a fishhook, the combination comprising: an outer elongated member adapted to be attached to a fishing rod in parallel disposition thereto; an inner member movably mounted within said outer member; hook means mounted on said inner member and adapted to be attached releasably to the fishing line; main spring means for urging resiliently said members to an initial position; latching means for fixing releasably said members in a set position against the force of said main spring means and for freeing the two members relative to one another in response to a force applied to said hook means via the fishing line so that said members return abruptly under the force of said main spring means to their initial position, thereby jerking on the fishing line to set the fishhook in place to catch a fish; wherein said hook means is slidably mounted on said inner member and includes adjustable tension spring means for biasing said hook means toward said inner member.

7. A fishing device according to claim 6, further including signal means responsive to the freeing of said members by said latching means for generating an attention attracting signal to alert the user to the catching of a fish.

8. In a fishing device adapted to be attached to a fishing rod having a fishing line connected at one end to the rod and at the other end to a fishhook, the combination comprising: an outer elongated member adapted to be attached to a fishing rod in parallel disposition thereto; an inner member movably mounted within said outer member; hook means mounted on said inner member and adapted to be attached releasably to the fishing line; main spring means for urging resiliently said members to an initial position; latching means for fixing releasably said members in a set position against the force of said main spring means and for freeing the two members relative to one another in response to a force applied to said hook means via the fishing line so that said members return abruptly under the force of said main spring means to their initial position, thereby jerking on the fishing line to set the fishhook in place to catch a fish; further including signal means responsive to the freeing of said members by said latching means for generating an attention attracting signal to alert the user to the catching of a fish; further including a cam mechanism having a reciprocatively mounted push button at the rear end portion of said inner tube for releasing the fishing line from said hook means and for turning off said signal means.

* * * * *